US011563827B1

(12) United States Patent
Li et al.

(10) Patent No.: US 11,563,827 B1
(45) Date of Patent: Jan. 24, 2023

(54) METHOD AND SYSTEM FOR NETWORK PERFORMANCE OPTIMIZATION SERVICE

(71) Applicant: Verizon Patent and Licensing Inc., Basking Ridge, NJ (US)

(72) Inventors: Feng Li, Lexington, MA (US); Haim S. Ner, Fair Lawn, NJ (US); Bjorn Olof Erland Kalderen, South Orange, NJ (US); Anant Shah, Los Angeles, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/373,267

(22) Filed: Jul. 12, 2021

(51) Int. Cl.
*H04L 67/60* (2022.01)
*H04W 24/02* (2009.01)

(52) U.S. Cl.
CPC ............. *H04L 67/60* (2022.05); *H04W 24/02* (2013.01)

(58) Field of Classification Search
CPC ................................ H04L 67/60; H04W 24/02
See application file for complete search history.

(56) References Cited

U.S. PATENT DOCUMENTS

| | | | | |
|---|---|---|---|---|
| 10,733,307 B1 * | 8/2020 | Wolters | ................... | H04L 67/60 |
| 2011/0276579 A1 * | 11/2011 | Colrain | ............... | G06F 16/2379 |
| | | | | 707/756 |
| 2011/0283017 A1 * | 11/2011 | Alkhatib | ............. | H04L 12/4633 |
| | | | | 718/1 |
| 2015/0039774 A1 * | 2/2015 | Ellis | ...................... | H04W 12/00 |
| | | | | 709/228 |
| 2015/0078173 A1 * | 3/2015 | Javed | .................... | H04W 24/08 |
| | | | | 370/241 |
| 2017/0208005 A1 * | 7/2017 | Luke | ..................... | H04L 45/122 |
| 2019/0281110 A1 * | 9/2019 | Kumar | ................ | H04L 67/1001 |
| 2020/0177461 A1 * | 6/2020 | Zhu | .......................... | G06F 9/542 |
| 2021/0212168 A1 * | 7/2021 | Yoden | .................... | H04L 67/561 |

* cited by examiner

*Primary Examiner* — Michael A Keller
*Assistant Examiner* — Thao D Duong

(57) ABSTRACT

A method, a device, and a non-transitory storage medium are described in which a network performance optimization service is provided. A load balancer device may receive, from an end device, an application service request for an application service that is available from multiple server devices of an application layer network. The load balancer device may determine, from a source identifier associated with the end device and obtained from the application service request, that the source identifier does not map to a network traffic forwarding rule of a set of stored network traffic forwarding rules. In response, the load balancer device may map the source identifier to an application service profile of a set of stored application service profiles; select, based on the application service profile, a first server device of the multiple server devices and establish the first server device to be the destination of the application service request.

20 Claims, 7 Drawing Sheets

METHOD AND SYSTEM FOR NETWORK PERFORMANCE OPTIMIZATION SERVICE

BACKGROUND

Development and design of communication networks present certain challenges from a network-side perspective and an end device perspective. Multi-access edge computing (MEC), also known as mobile edge computing, is being developed in which some network capabilities— conventionally implemented in a core network or a cloud network (e.g., computation, storage, transport, etc.)—are alternatively situated at the network "edge" relative to a point of attachment of an end device to a radio access network (RAN). In MEC environments, Internet service providers (ISPs) may have a pool of servers, such as physical servers, virtual hosts, and/or service containers, which are capable of providing similar functionality.

DETAILED DESCRIPTION

Figure 1:
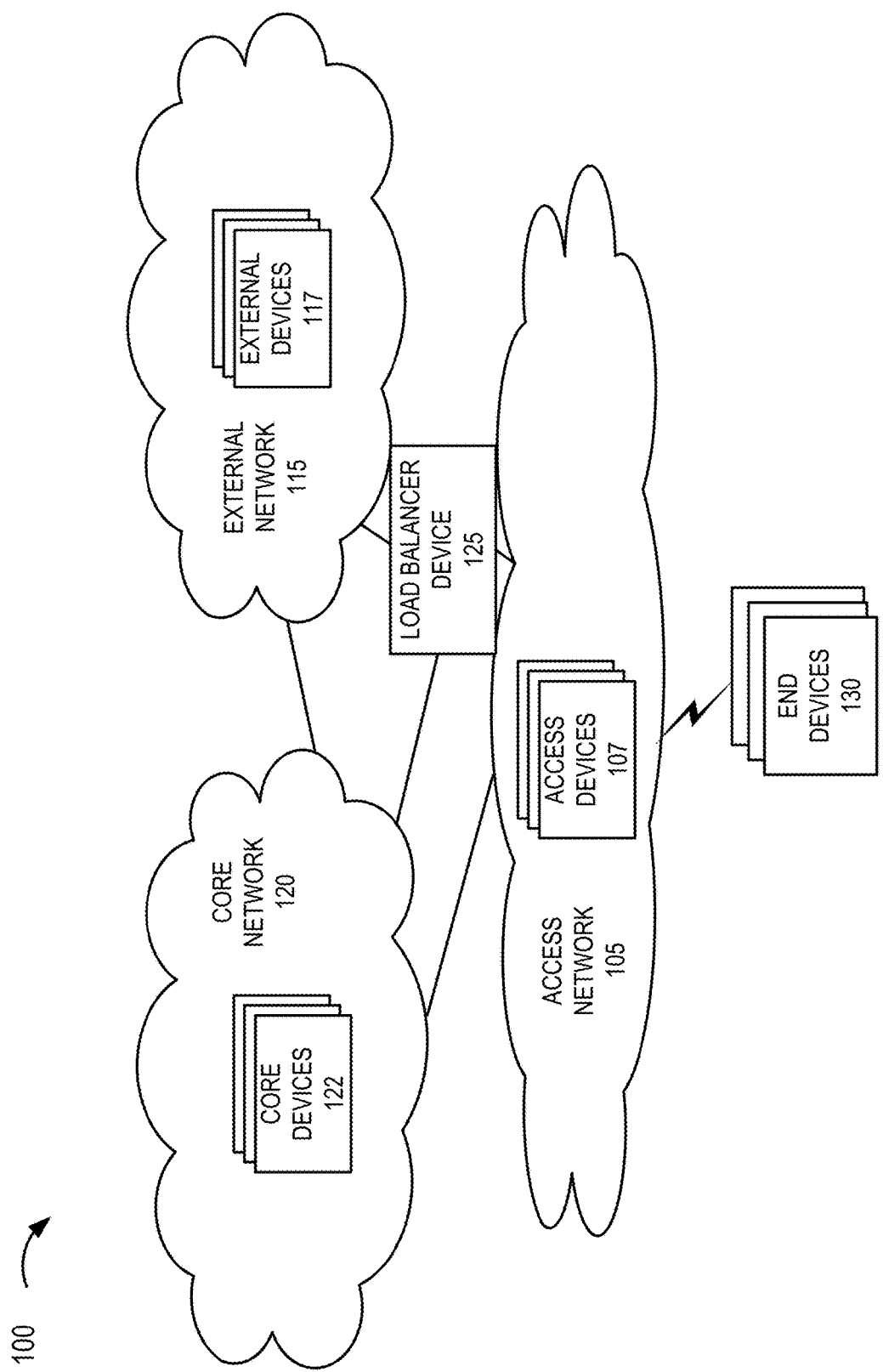
FIG. 1 is a diagram illustrating an exemplary environment in which an exemplary embodiment of a network performance optimization service may be implemented.

The following detailed description refers to the accompanying drawings. The same reference numbers in different drawings may identify the same or similar elements. Also, the following detailed description does not limit the invention.

MEC networks or other types of end device application or service layer networks (referred to as "application service layer networks") provide an application and/or a service (referred to as an "application service"). The application service may include a monolithic application, a microservice, or another type of configurable architecture of an application service. Application services available to end devices may be configured with MEC services to reduce end-to-end latency in a data transport network and to enable offloading of high computation loads from the core network. Typically, MEC resources may be selected for supporting an application session in consideration of geographic proximity to the end device.

With the rapid deployment of Fifth Generation (5G) new radio (NR) cellular networks and beyond, network operators and/or other entities face challenges with the implementation of network optimization services. That is, the numerous end devices and service applications executable on those end devices increase the difficulty of applying a single network optimization profile target that is suitable for all end devices/ service applications. For example, a throughput-oriented network optimization profile may simultaneously increase latency and/or latency jitter of time-sensitive application services (e.g., games), and degrade associated quality of experience (QoE) scores. On the other hand, a latency-oriented network optimization profile may cause degradation in the throughput of throughput-intensive service applications.

Moreover, the end devices themselves may support different optimization profiles. For example, Long Term Evolution (LTE) or Fourth Generation (4G) end devices may operate on a radio spectrum that differs, for instance, from end devices having 5G millimeter wave (mmWave) capability. The differences among these air interface types may reduce the effectiveness of network optimization profiles. For example, a 5G end device with mmWave capability may readily exceed 2 Gbps throughput, while LTE end devices might only achieve speeds of 250 Mbps. Consequently, a network optimization profile designed for 5G mmWave devices may create a "buffer bloat" issue by overwhelming an LTE end device with a large volume of data, resulting in a considerable amount of packet drops over the air interface.

According to exemplary embodiments, a carrier-level performance optimization solution for core networks is described, which may meet various network optimization requirements for multiple types of end devices and across a range of application services. According to an exemplary embodiment, the performance-oriented load balancer may be implemented by one or more core network devices. For example, the one or more core network device may include a user plane function (UPF), a packet data network gateway (PGW), and/or another type of Internet Protocol (IP) or Layer 3 load-balancer device, as described herein, and without modification to client- or server-side software. According to an exemplary embodiment, the core network device may provide connectivity between end devices and application service layer networks of a MEC environment. According to an exemplary embodiment, the core network device may determine and apply an appropriate performance profile pertaining to application service sessions. Advantageously, this may be accomplished without complex kernel level implementation and/or enhancement on end devices or server-side software.

In view of the foregoing, the network performance optimization service may partition servers (e.g., physical servers, virtual hosts, service containers, etc.) of a pool of servers, into smaller server pools, and correlate customized optimization profiles (e.g., congestion control protocols) in each sub-pool. For example, a group of servers may use transmission control protocol (TCP) bottleneck bandwidth round-trip propagation time (BBR), while another group of servers may use TCP CUBIC, or a different congestion control algorithm/mechanism. As such, the performance-oriented load balancer may distribute data packet traffic to select application servers not only for load balancing purposes but also for performance optimization purposes.

FIG. 1 is a diagram illustrating an exemplary environment 100 in which an exemplary embodiment of the network performance optimization service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes a load balancer device 125 and end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120. According to an exemplary embodiment, access network 105 may provide the network performance optimization service, as described herein.

Access network 105 may include different and multiple functional splitting, such as options 1, 2, 3, 4, 5, 6, 7, or 8 that relate to combinations of access network 105 and core network 120 including an EPC network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA NR, SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, mmWave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved LTE (eLTE) evolved Node B (eNB), an eNB, a radio network controller (RNC), a remote radio head (RRH), a baseband unit (BBU), a radio unit (RU), a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

Access device 107 may include a controller device. For example, access device 107 may include a RAN Intelligent Controller (RIC).

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three-dimensional (3D) and adaptive beamforming (also known as full-dimensional agile MIMO), 2D beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

According to some exemplary embodiments, access device 107 may include logic that provides the network performance optimization service. For example, access device 107 may make determinations for when a communication may be routed to core network 120 associated with load balancer device 125. According to some exemplary embodiments, access device 107 may make these determinations based on a type of procedure associated with a message (e.g., an attachment procedure, a handover procedure, a registration procedure, or another type of network procedure) and/or a type of application service, such as a category of an application service (e.g., an automation application service, an IoT application service, a real-time (RT) application service, or another type of application service category), a sub-category of an application service (e.g., industrial automation, consumer IoT (CIoT) application service, or another type of sub-category of an application service), a performance metric (e.g., minimum, maximum, guaranteed, and/or other quantifier pertaining to latency, throughput, bitrate, error rate, and/or another type of performance indicator), and/or another criterion that may indicate or identify a type of application service.

External network 115 may include one or multiple networks of one or multiple types and technologies. For example, external network 115 may be implemented to include a service or an application-layer network, a cloud network, a private network, a public network, a MEC network, a fog network, the Internet, a service provider network, the World Wide Web (WWW), an Internet Protocol Multimedia Subsystem (IMS) network, a Rich Communication Service (RCS) network, an SDN, a virtual network, a packet-switched network, a data center, a cloud network, or another type of network that may provide access to and may host an end device application, service, or asset (also referred to as an "application service").

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include an NGC or a 5G network, an EPC of an LTE network, an LTE-Advanced (LTE-A) network, and/or an LTE-A Pro network, a future generation core network (e.g., a 6G or beyond core network, etc.), and/or another type of core network.

Depending on the implementation of core network 120, core network 120 may include various types of network devices that are illustrated in FIG. 1 as core devices 122. For example, core devices 122 may include a UPF, a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a PGW, an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

Load balancer device 125 may include a network device that provides the network performance optimization service, as described herein. Load balancer device 125 may be an IP layer (L3) device that includes logic for forwarding data packet traffic to a node based on defined rules. According to one embodiment, load balancer device 125 may include a memory that stores data structures such as a service profile map, a server profile map, a forwarding rule table, or other information. as described herein. Load balancer device 125 may be configured to execute a server selection process based on pilot packets, for example, received from a core device 122 such as a PGW or a UPF. Depending on the implementation of load balancer device 125, load balancer device 125 may partition servers into subset pools of servers that run respective optimization profiles in each pool. For example, a subset of servers may use TCP BBR, another subset of servers may use TCP CUBIC, and still other subsets of servers may use other congestion control parameters.

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

According to some exemplary embodiments, end device 130 may include logic that provides portions of the network performance optimization service. For example, end device 130 may transmit messages containing device profile information via access network 105 which are forwarded to load balancer device 125. According to some exemplary embodiments, end device 130 may transmit these messages based on a type of procedure associated with a message (e.g., an attachment procedure, a handover procedure, a registration procedure, or another type of network procedure) and/or a type of application service being requested, as described herein.

Figure 2:
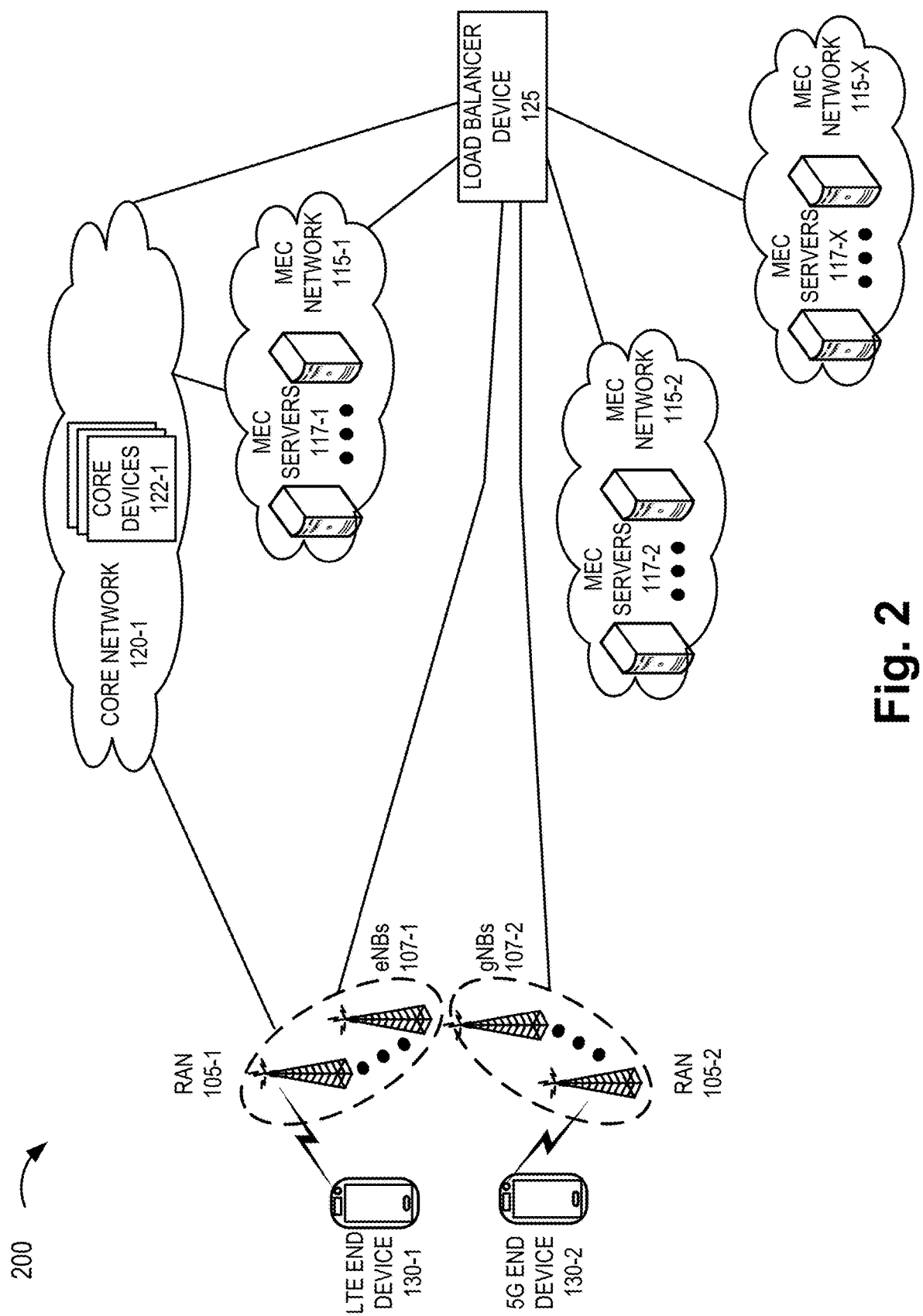
FIG. 2 is a diagram illustrating another exemplary environment in which an exemplary embodiment of the network performance optimization service may be implemented.

FIG. 2 is a diagram illustrating another exemplary environment 200 in which an exemplary embodiment of the network performance optimization service may be implemented. As illustrated, environment 200 includes an LTE end device 130-1 and a 5G end device 130-2, a RAN 105-1 including eNB 107-1 and a RAN 105-2 including gNB 107-2. As further illustrated, environment 200 includes a MEC network 115-1 including MEC servers 117-1, a MEC network 115-2 including MEC servers 117-2, a MEC network 115-X including MEC servers 117-X, core network 120 including core devices 122, and a load balancer device 125.

The number and arrangement of networks and network devices illustrated and described are exemplary. Additionally, the number, arrangement, and type of connections between the devices and between networks are exemplary. RAN 105-1 and RAN 105-2 may each include an exemplary implementation of access network 105 and eNB 107-1 and gNB 107-2, as described herein, and be associated with a distinct network operator (e.g., wireless network operator). Similarly, core network 120-1 may include an exemplary implementation of core network 120-1 and core devices 122-1, as described herein, and be associated with a distinct network operator or other type of entity. According to an exemplary embodiment, core devices 122-1 may be implemented to include a UPF and/or a PGW that provides a network anchor service. MEC networks 115-1, 115-2, and 115-X and MEC servers 117-1, 117-2, and 117-X are exemplary implementations of external network 115 and external devices 117, as described herein. According to an exemplary embodiment, MEC servers 117-1, 117-2, and 117-X may be partitioned into server pools that each run a respective optimization profile, as described herein. According to an exemplary embodiment, load balancer device 125 may be implemented as a network layer load balancer configured to perform a server selection process among the server pools according to the respective optimization profiles.

Referring to FIG. 2, assume end device 130-1 invokes an attachment and/or registration procedure with core network 120-1 via RAN 105. Subsequent to registration with and/or attachment to core network 120-1, end device 130-1 may generate and transmit an application service request for an application service from MEC network 115. In response, load balancer device 125 may perform a server selection process, as described herein, based on criteria pertaining to the application service session to be established (e.g., KPI, performance metric, QoS, amount of data, time period of data session, etc.), for example, and satisfaction of performance metrics (e.g., latency, bit rate, throughput, error rate, reliability, or other performance indicator) associated with user plane traffic and managing control signaling pertaining to the application service session.

Figure 3A:
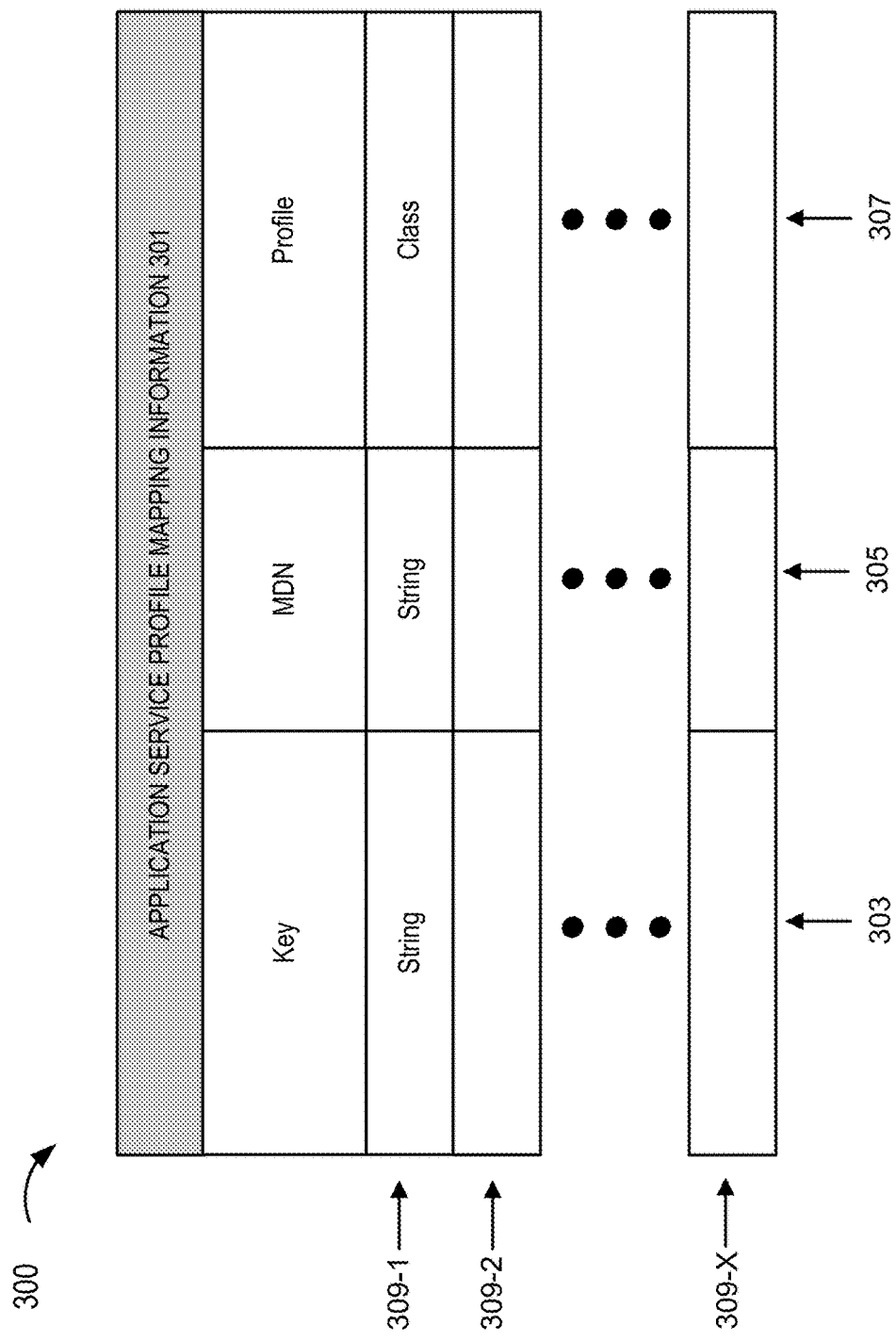
FIGS. 3A-3C are diagrams illustrating exemplary mapping information according to exemplary embodiments of the network performance optimization service.

FIG. 3A is a diagram that illustrates exemplary application service mapping information 301. For example, referring to a table 300 in FIG. 3A, exemplary mapping information 301 is illustrated, which may be extracted from pilot packets. Table 300 may include a Key field 303, a mobile directory number (MDN) field 305, and a Profile field 307. According to other exemplary embodiments, application service mapping information 301 may include fewer, additional, and/or different fields, as described herein.

As further illustrated, table 300 includes entries 309-1 through 309-X (also referred as entries 309, or individually or generally as entry 309) that each includes a grouping of fields 303 through 307 that are correlated (e.g., a record, etc.). Mapping information 301 is illustrated in tabular form merely for the sake of description. In this regard, mapping information 301 may be implemented in a data structure different from a table (e.g., a list, a flat file, etc.), a database, or another type of structure. Additionally, values illustrated in fields 303 through 307 are exemplary. According to other embodiments, the values, strings, or instances of information stored in a field may be different. The number of entries 309 are exemplary for the sake of description purposes.

Key field 303 may store data that indicates an Internet Protocol version 6 (IPv6) address, an IPv4 address, and/or another type of routing protocol address associated with a data packet p received from end device 130 via RAN 105. According to some embodiments, where an IP address associated with end device 130 is translated using network address translation (NAT), key field 303 may also include a port range, for example, in addition to the IPv4 address.

According to some exemplary embodiments, values from an entry 309-x in key field 303 may be used to determine an MDN or another type of unique identifier (e.g., a Mobile Station International Subscriber Directory Number (MSISDN), an International Mobile Subscriber Identity (IMSI), a UE identifier, a Subscription Permanent Identifier (SUPI), an International Mobile Equipment Identity (IMEI), a Mobile Equipment Identifier (MEID), a permanent equipment identifier (PEI), a globally unique identifier (GUI), a temporary identifier, or another suitable user and/or end device identifier), a Public Land Mobile Network (PLMN) identifier, and/or a closed subscriber group identifier) for end device 130, as stored in MDN field 305 for entry 309-x.

Profile field 307 may store data that indicates a class of service associated with an end device 130 or an application service. The class of service may afford a certain level of priority, minimum performance metric, and/or other attributes of wireless service, a connection that supports an application service/session, end device capabilities, and so forth. For example, the indicated class may correspond to a profile for a 5G interface, an LTE interface, high throughput, low latency, and/or other attributes of the application service/session.

Figure 3B:
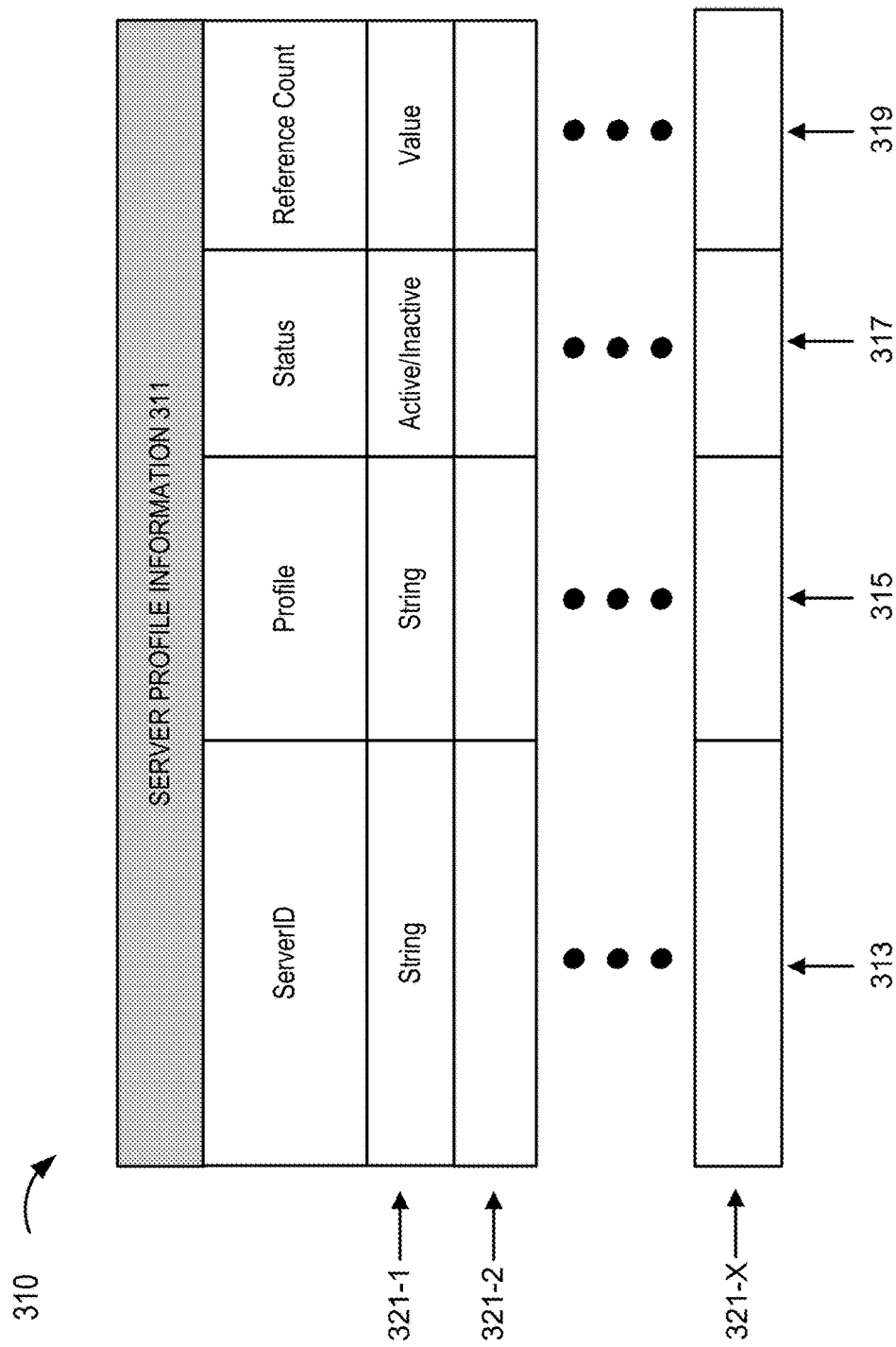

FIG. 3B is a diagram that illustrates exemplary server profile information 311. For example, referring to a table 310 in FIG. 3B, exemplary server profile information 311 associated with MEC servers 117 is illustrated. Table 310 may include a ServerID field 313, a Profile field 315, a Status field 317, and a Reference Count field 319. According to other exemplary embodiments, server profile information 311 may include fewer, additional, and/or different fields, as described herein. As further illustrated, table 310 includes entries 321-1 through 321-X (also referred as entries 321, or individually or generally as entry 321) that each includes a grouping of fields 313 through 319 that are correlated (e.g., a record, etc.).

ServerID field 313 may store data that indicates a unique identifier for each physical server, virtual host, and/or service container that may provide an application service to end device 130. For example, ServerID field 313 may include an entry 321 that identifies MEC server 117-x. Profile field 315 may store data that indicates a class of service associated with the corresponding server. The class of service may indicate performance metrics, and/or other attributes of a connection that supports an application service/session, end device capabilities, and so forth. For example, the indicated class may correspond to a profile for a 5G interface, an LTE interface, high throughput, low latency, 5G QoS Identifier (5QI), QoS Class Identifier (QCI), and/or other attributes of the server. Status field 317 may store data that indicates a status of a corresponding server, e.g., active, inactive, etc. Reference Count field 319 may store data that indicates a current number of connections to a corresponding server.

According to some exemplary embodiments, the server profile information, as described herein, may include other instances of information. For example, an artificial intelligence (AI) device may provide load and/or available resource information (e.g., current, predictive) that may correlate to an end-to-end path or segment path associated with an entry of the server profile information. For example, the load and/or available network resource information may pertain to a corresponding server device, a communication link, a network resource of the server device (e.g., processor, memory, etc.), a network slice, and/or another physical, logical, or virtual resource. The load and/or available resource information may be updated (e.g., continuously, etc.).

Figure 3C:
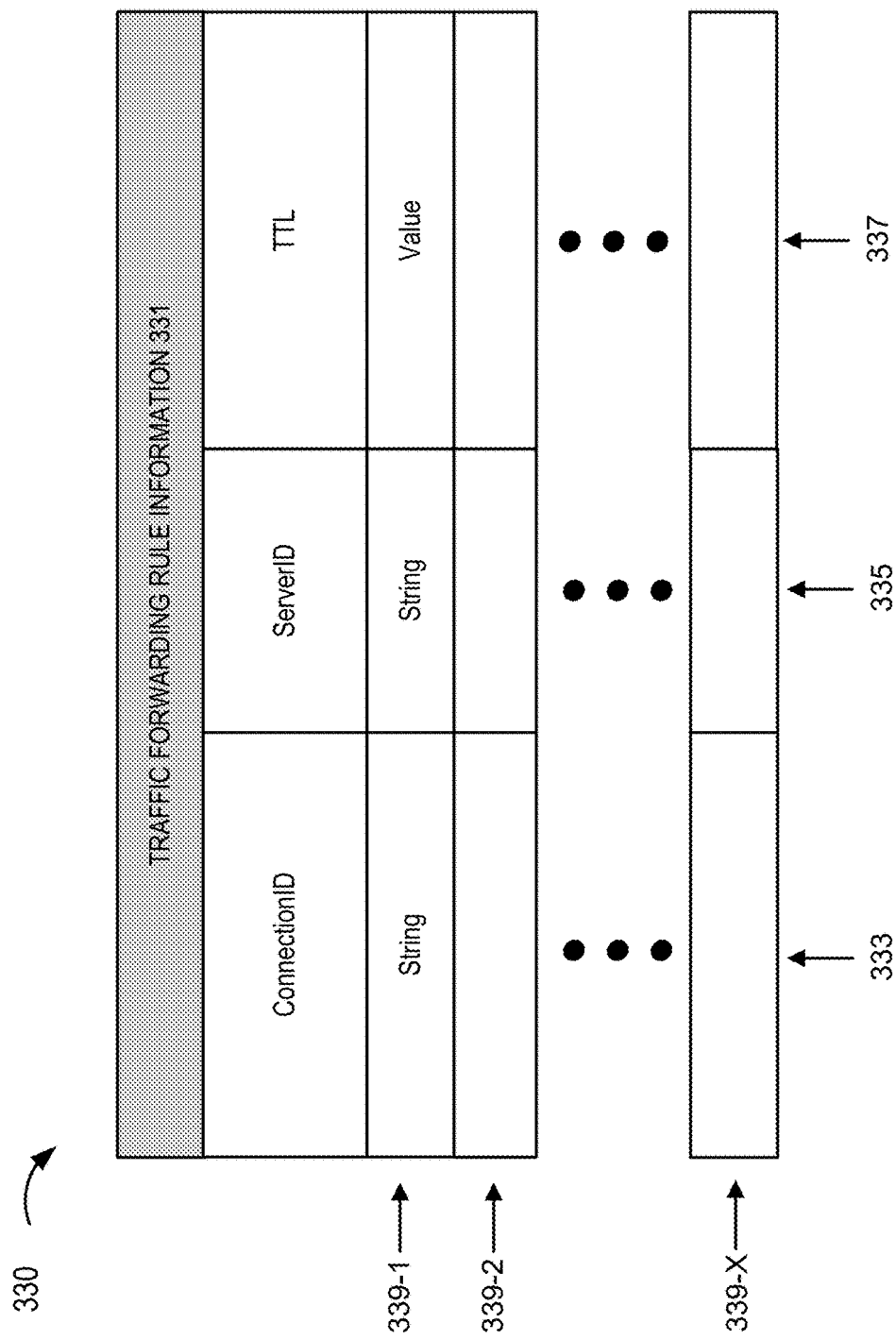

FIG. 3C is a diagram that illustrates exemplary traffic forwarding rule information 331. For example, referring to a table 330 in FIG. 3C, exemplary traffic forwarding rule information 311 is illustrated. Table 330 may include a ConnectionID field 333, a ServerID field 335, and a time-to-live (TTL) field 337. According to other exemplary embodiments, traffic forwarding rule information 331 may include fewer, additional, and/or different fields, as described herein.

As further illustrated, table 330 includes entries 339-1 through 339-X (also referred as entries 339, or individually or generally as entry 339) that each includes a grouping of fields 333 through 337 that are correlated (e.g., a record, etc.). Traffic forwarding rule information 331 is illustrated in tabular form merely for the sake of description. In this regard, traffic forwarding rule information 331 may be implemented in a data structure different from a table (e.g., a list, a flat file, etc.), a database, or another type of structure. Additionally, values illustrated in fields 333 through 337 are exemplary. According to other embodiments, the values, strings, or instances of information stored in a field may be different. The number of entries 339 are exemplary for the sake of description purposes.

ConnectionID field 333 may store data that indicates an IPv6 address, an IPv4 address, and/or another type of routing protocol address associated with a data packet p received from end device 130 via RAN 105, as discussed above with respect to FIG. 3A. ServerID field 335 may store data that indicates a unique identifier for each physical server, virtual host, and/or service container that may provide an application service to end device 130, as described above with respect to FIG. 3B. TTL field 337 may store data that indicates an amount of time before each forwarding rule will expire after being periodically decremented. For example, when the value reaches zero (0), the traffic rule may be expired and removed from table 330.

Figure 4:
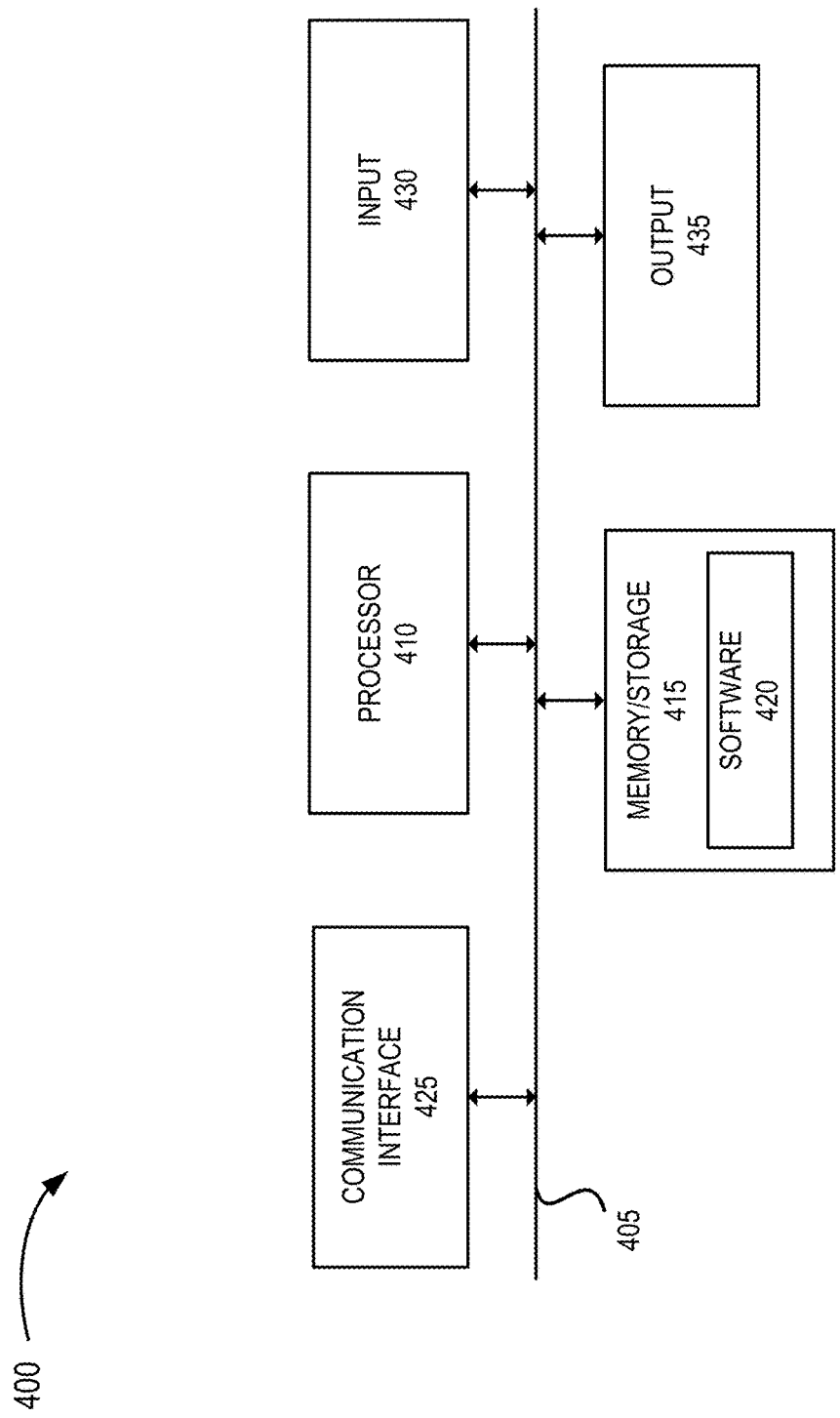
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, load balancer device 125, end device 130, and/or other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and such.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, e.g., multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to load balancer device 125, software 420 may include an application that, when executed by processor 410, provides a function and/or a process of the multi-operator anchor service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
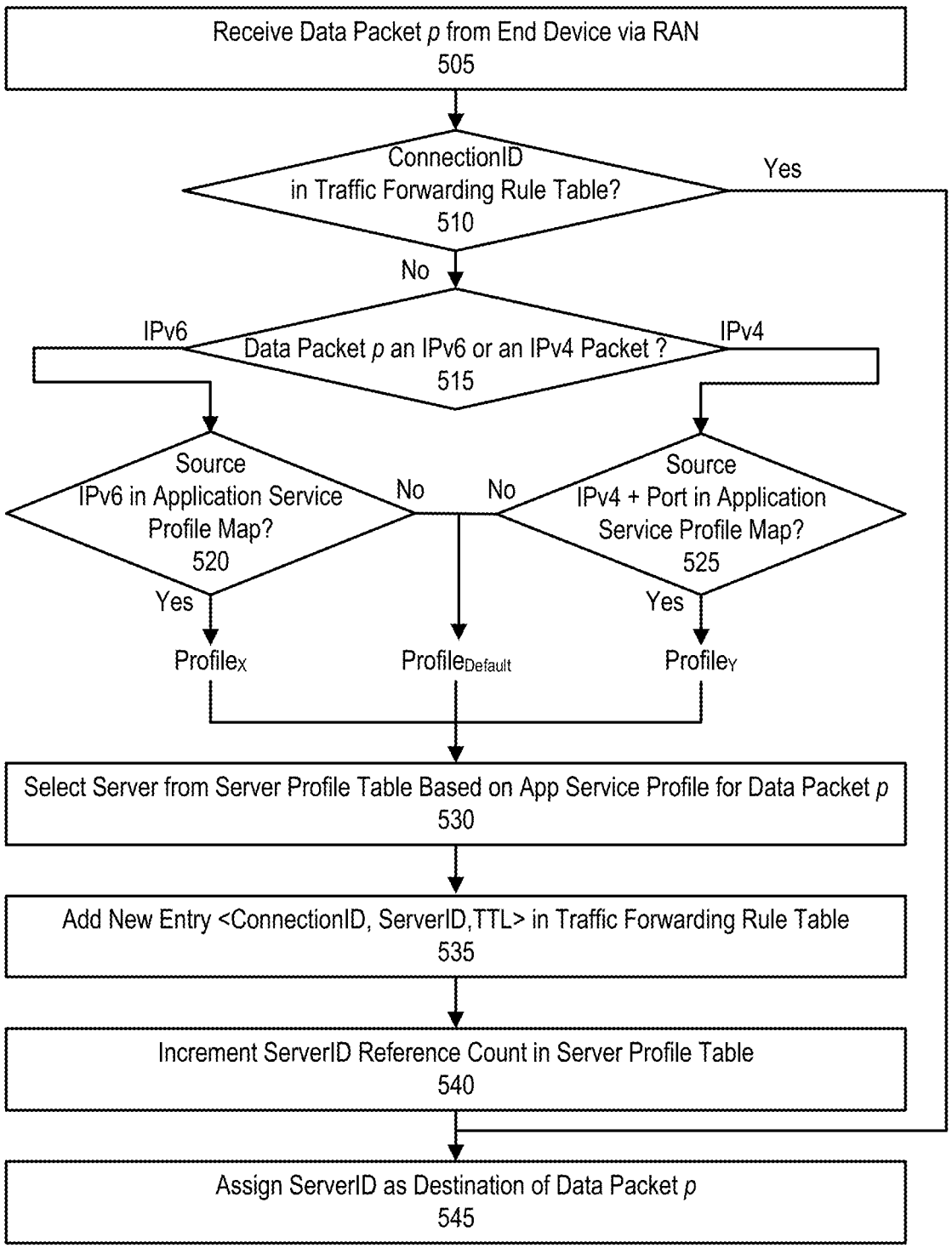
FIG. 5 is a flow diagram illustrating an exemplary process of an exemplary embodiment of the network performance optimization service.

FIG. 5 is a flow diagram illustrating an exemplary process 500 of an exemplary embodiment of the network performance optimization service. According to an exemplary embodiment, load balancer device 125 may perform a step of process 500. According to an exemplary implementation, processor 410 executes software 420 to perform the step of process 500, as described herein. Alternatively, the step may be performed by execution of only hardware. According to an exemplary embodiment, load balancer device 125 may perform process 500 in a MEC environment, as described herein.

In block 505, load balancer device 125 may receive data packet(s) p from RAN 105-1. For example, load balancer device 125 may receive a message from end device 130 via core device 122 (e.g., a PGW or a UPF) pertaining to attachment and/or registration with core network 120. In an embodiment, data packet(s) p may be associated with a previously received pilot packet(s).

In block 510, load balancer device 125 may use data packet p's ConnectionID to determine whether the connection ID already exists in a traffic forwarding rule table or other data structure, for example, maintained by load balancer device 125. For example, load balancer device 125 may extract a source IP address and/or a port number associated with end device 130 in a header of data packet(s) p to compare with values in a ConnectionID field of a traffic forwarding rule table. Upon a determination that a forwarding rule correlates to the connection ID, block 510—Yes, load balancer device 125 may return the selected server ID as a destination of data packet(s) p, block 545, and process 500 may end.

Upon a determination that no forwarding rule correlates to the connection ID, block 510—No, load balancer device 125 may, in block 515, determine whether data packet(s) p is an IP version 6 (IPv6), e.g., from a data session with 5G end device 130-2, or an IP version 4 (IPv4) packet, e.g., from a data session with end device 130-1. Upon determining that data packet(s) p is an IPv6 packet, load balancer device 125 may, in block 520, use data packet p's source IP address to determine whether the source IPv6 exists in a service profile map maintained by load balancer device 125. Upon determining that the source IPv6 exists, block 520—Yes, load balancer device 125 may retrieve the respective service profile (e.g., $Profile_X$) from the service profile map.

Alternatively, upon determining that data packet(s) p is an IPv4 packet, load balancer device 125 may, in block 525, use data packet p's source IP address and/or port number information, to determine whether the source IPv4+port exists in a service profile map maintained by load balancer device 125. Upon determining that the source IPv4+port exists, block 525—Yes, load balancer device 125 may retrieve the respective service profile (e.g., $Profile_Y$) from the service profile map. On the other hand, upon determining that either the source IPv6 does not exist in the service profile map, block 520—No, or the Source IPv4+Port does not exist in the service profile map, block 520—Yes, load balancer device 125 may retrieve a default service profile (e.g., $Profile_{Default}$) based on matching performance criteria between the requested service application and the service profiles of available MEC servers 117.

In block 530, load balancer device 125 may select a server, from a pool of servers identified in a server profile table maintained by load balancer device 125, which supports the service profile ($Profile_X$, $Porfile_Y$, $Profile_{Default}$, etc.) determined for data packet(s) p. For example, a server selection policy implemented by load balancer device 125 may use a round robin selection process, and/or select a server with a least load (e.g., minimum reference count) from a group of servers which are indicated as supporting the determined service profile.

In block 535, load balancer device 125 may add a new entry in the traffic forwarding rule table, including values for a ConnectionID field, a ServerID field, and a TTL field. For example, load balancer device 125 may specify a <srcIP, srcPort, ServerID, TTL>corresponding to a data session with end device 130 and MEC network 115 pertaining to an application service provided by MEC server 117. In block 540, load balancer device 125 may increment the ServerID reference count field in the server profile table. In block 545, load balancer device 125 may return the ServerID for the associated MEC server 117 as the destination of data packet (s) p.

FIG. 5 illustrates an exemplary embodiment of a process of the network performance optimization service, however according to other exemplary embodiments, network performance optimization service may perform additional operations, fewer operations, and/or different operations than those illustrated and described. For example, load balancer device 125 may perform steps pertaining to TCP performance enhancement proxies, as described herein.

As set forth in this description and illustrated by the drawings, reference is made to "an exemplary embodiment," "exemplary embodiments," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device (e.g., device 400). A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method performed by one or more nodes in an application layer network, the method comprising:
   receiving, from an end device via a network device, an application service request for an application service that is available from multiple server devices of the application layer network;
   determining, from a source identifier associated with the end device and obtained from the application service request, that the source identifier does not map to a network traffic forwarding rule of a set of stored network traffic forwarding rules;
   mapping the source identifier to an application service profile of a set of stored application service profiles associated with the requested application service;
   selecting, based on the application service profile, a first server device of the multiple server devices;
   updating the set of stored network traffic forwarding rules to map the source identifier to the network traffic forwarding rule determined to include the first server device; and
   establishing the first server device to be a destination of the application service request.

2. The method of claim 1, wherein the set of stored application service profiles includes throughput information, latency information, loading information, and radio access technology (RAT) information corresponding to each of the application service profiles.

3. The method of claim 2, wherein mapping the source identifier to the application service profile comprises:
   retrieving a default application service profile based on a performance metric associated with the application service request, wherein the performance metric relates to at least one the throughput information, latency information, loading information, or RAT information.

4. The method of claim 1, wherein the source identifier includes a network address for the end device.

5. The method of claim 4, further comprising:
   determining that the network address is an Internet Protocol version 6 (IPv6) address; and
   determining a mobile directory number (MDN) of the end device using the IPv6 address.

6. The method of claim 1, wherein the source identifier includes a network address and a port range for the end device.

7. The method of claim 6, further comprising:
   determining that the network address is an Internet Protocol version 4 (IPv4) address; and
   determining a mobile directory number (MDN) of the end device using the IPv4 address and the port range.

8. The method of claim 1, wherein the application layer network comprises a multi-access edge computing (MEC) network, and wherein the multiple server devices comprise MEC server devices.

9. The method of claim 1, wherein the network device comprises a packet data network gateway (PGW) or a user plane function (UPF), the method further comprising:
   receiving pilot packets from the PGW or the UPF.

10. A network device comprising:
    a processor configured to:
       receive, from an end device, an application service request for an application service that is available from multiple server devices of an application layer network;
       determine, from a source identifier associated with the end device and obtained from the application service request, that the source identifier does not map to a network traffic forwarding rule of a set of stored network traffic forwarding rules;
       map the source identifier to an application service profile of a set of stored application service profiles associated with the requested application service;
       select, based on the application service profile, a first server device of the multiple server devices;
       update the set of stored network traffic forwarding rules to map the source identifier to the network traffic forwarding rule determined to include the first server device; and
       establish the first server device to be a destination of the application service request.

11. The network device of claim 10, wherein the source identifier includes a network address for the end device.

12. The network device of claim 11, wherein the processor is further configured to:
    determine that the network address is an Internet Protocol version 6 (IPv6) address, and
    determine a mobile directory number (MDN) of the end device using the IPv6 address.

13. The network device of claim 10, wherein the source identifier includes a network address and a port range for the end device.

14. The network device of claim 13, wherein processor is further configured to:
    determine that the network address is an Internet Protocol version 4 (IPv4) address, and
    determine a mobile directory number (MDN) of the end device using the IPv4 address and the port range.

15. The network device of claim 10, wherein the processor is further configured to retrieve a default application service profile based on a performance metric associated with the application service request.

16. A non-transitory computer-readable medium including instructions, executed by one or more processors, for causing the one or more processors to:
    receive, from an end device, an application service request for an application service that is available from multiple server devices of an application layer network;

determine, from a source identifier associated with the end device and obtained from the application service request, that the source identifier does not map to a network traffic forwarding rule of a set of stored network traffic forwarding rules;

map the source identifier to an application service profile of a set of stored application service profiles associated with the requested application service;

select, based on the application service profile, a first server device of the multiple server devices;

update the set of stored network traffic forwarding rules to map the source identifier to the network traffic forwarding rule determined to include the first server device; and establish the first server device to be a destination of the application service request.

17. The non-transitory computer-readable medium of claim 16, wherein the source identifier includes a network address for the end device.

18. The non-transitory computer-readable medium of claim 17, further comprising instructions for causing the one or more processors to:

determine that the network address is an Internet Protocol version 6 (IPv6) address, and determining a mobile directory number (MDN) of the end device using the IPv6 address.

19. The non-transitory computer-readable medium of claim 16, wherein the source identifier includes a network address and a port range for the end device.

20. The non-transitory computer-readable medium of claim 19, further comprising instructions for causing the one or more processors to:

determine that the network address is an Internet Protocol version 4 (IPv4) address, and determine a mobile directory number (MDN) of the end device using the IPv4 address and the port range.

\* \* \* \* \*